United States Patent [19]

Kabe et al.

[11] Patent Number: 4,573,511

[45] Date of Patent: Mar. 4, 1986

[54] PNEUMATIC TIRE

[75] Inventors: Kazuyuki Kabe; Tuneo Morikawa, both of Hiratsuka, Japan

[73] Assignee: The Yokohama Rubber Co., Ltd., Tokyo, Japan

[21] Appl. No.: 549,821

[22] Filed: Nov. 8, 1983

[51] Int. Cl.$^4$ .............................................. B60C 9/06
[52] U.S. Cl. ..................................... 152/548; 152/539
[58] Field of Search ........ 152/330 R, 354 R, 354 RB, 152/355, 356 R, 356 A, 357 R, 359, 361 R, 361 FP, 361 DM

[56] References Cited

U.S. PATENT DOCUMENTS 4,287,929  9/1981  Huinink ........................... 152/354 R
4,469,157  9/1984  Horikawa et al. ............... 152/354 R

FOREIGN PATENT DOCUMENTS

114704  7/1982  Japan .

Primary Examiner—Lois E. Boland
Attorney, Agent, or Firm—Finnegan, Henderson, Farabow, Garrett & Dunner

[57] ABSTRACT

This pneumatic tire is of the type in which two belt-reinforcing layers crossing each other and at an angle of 15° to 30° with respect to the circumferential direction of the tire are laid over each other and over a carcass cord layer of a tread portion. The improvement lies in that the carcass cord layer consists of upper and lower layers; the lower carcass cord layer continues in its widthways direction so that each of its edges is turned up around one of a pair of right and left bead wires, respectively; the upper carcass cord layer has a split structure so that it is separated to the right and left at the tread portion; the edge portions of the upper carcass cord layer nearer the tread portion overlaps the belt-reinforcing layer to a width of at least 10 mm while the edge portions thereof nearer the bead portions are at a height of not more than 0.3 of the cross-sectional height of the tire measured from bead toe portions, and are separated from the bead wires; and the reinforcing cords of the upper and lower carcass cord layers are arranged so that the mean value $\frac{1}{2}(\alpha_2+\alpha_1)$ of the angle $\alpha_2$ of the reinforcing cords of the upper carcass cord layer and the angle $\alpha_1$ of the reinforcing cords of the lower carcass cord layer is between 95° to 120°, and the difference $(\alpha_2-\alpha_1)$ is between 10° to 60°, measured from the side on which the angle of the reinforcing cords of the belt reinforcing layer adjacent to the upper carcass cord layer is an acute angle with respect to the circumferential direction of the tire.

4 Claims, 12 Drawing Figures

$\beta = \frac{1}{2}(\alpha_1 + \alpha_2)$

PNEUMATIC TIRE

BACKGROUND OF THE INVENTION

This invention relates to a pneumatic tire, and more particularly, to a pneumatic tire in which the straight running stability is improved by reducing the ply steer that is conspicuous in radial tires in general, and in which the tire weight is reduced without spoiling the characteristics inherent to radial tires, such as their driving stability, high-speed durability, and load durability.

A prior-art radial tire for a passenger car usually has a construction in which at least two belt-reinforcing layers are provided over a carcass cord layer of a tread portion, substantially parallel to the circumferential direction of the tire. The reinforcing cords of the belt-reinforcing layer are inclined at an angle of 15° to 30° with respect to the circumferential direction of the tire, and cross each other. The carcass cord layer consists of one or two layers, and the edges of each layer are turned up around bead wires. The cords are arranged at an angle of about 90° to the circumferential direction of the tire. A radial tire of this kind is superior to a bias tire with respect to braking performance, low fuel consumption, and wear resistance, thanks to the belt-reinforcing layers described above. The problem with the radial tire is, however, that its stability when driven in a straight line is poor because of the belt-reinforcing layers. As the radial tire rotates and moves forward, a lateral force occurs either to the right or left of the forward direction, even if the slip angle is zero. This lateral force makes the car move in a direction different to that intended by the driver.

In general, the lateral force when the slip angle is zero consists of components of forces generated by two different mechanisms, one is referred to as "connicity" (CT) and the other "ply steer" (PS). They are classified as part of the uniformity characteristics of the tire. The connicity (CT) and ply steer (PS) can be expressed by the following formulas from their definition in accordance with the uniformity testing method (JASO C607) for car tires:

$$LFD_W = PS + CT \quad (1)$$

$$LFS_s = PS - CT \quad (2)$$

where LFD is the mean value of the lateral forces experienced while the tire rotates once, LFDs is the mean value measured at the outer (or serial) side of the tire, and LFDs is the mean value measured when the tire is turned inside out.

PS and CT can be obtained as follows from formulas (1) and (2):

$$CT = (LFD_W - LFD_s)\tfrac{1}{2} \quad (3)$$

$$PS = (LFD_W + LFD_s)\tfrac{1}{2} \quad (4)$$

Figure 1:
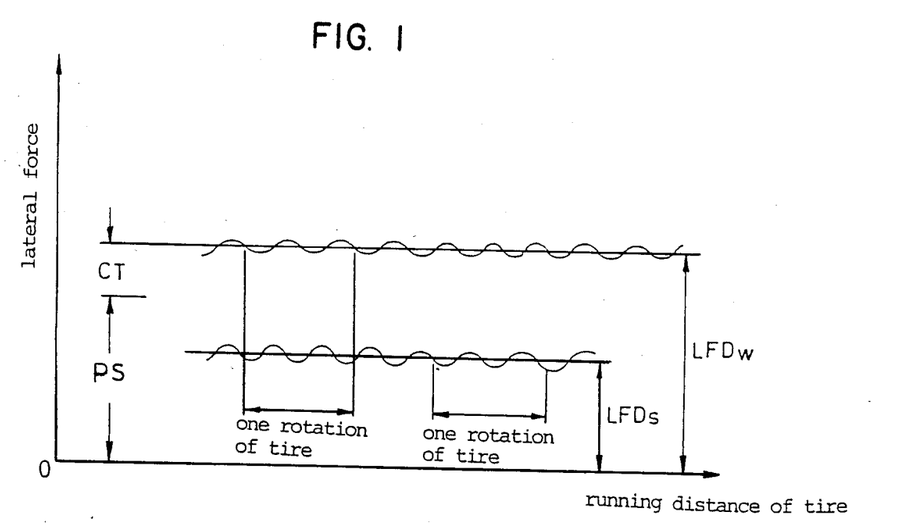
FIG. 1 is a graph of the relationship between the distance traveled by a radial tire and the lateral force thereon.

The relationship of formulas (1) through (4) can be illustrated diagrammatically as in FIG. 1.

Of the connicity and ply steer described above, connicity is believed to be a force generated because the tire shape is geometrically asymmetric about the center of the circumferential direction of the tire, that is, a force generated when a tire in the shape of a truncated cone rolls. The main reason for the generation of this force is the influence of the positions of the belt-reinforcing layers inserted into the tread of the tire. Hence the force can be reduced by improving the manufacture procedure. In contrast, ply steer is a force inherent to and arising from the structure of the belt-reinforcing layers themselves, and hence can not be reduced much in practice unless the structure of the belt-reinforcing layers is changed.

Figure 2A:
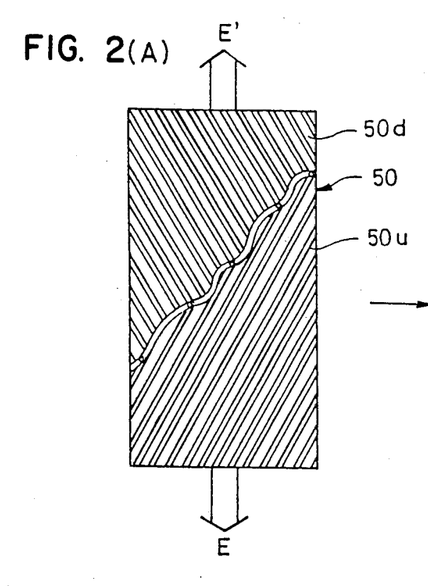
FIGS. 2(A) and 2(B) are views of a model illustrating the deformation of belt-reinforcing layers.
Figure 2B:
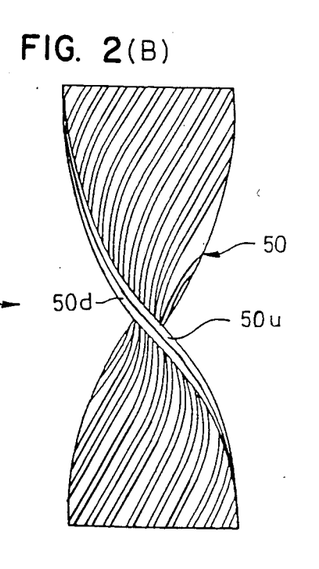

Now consider a belt-reinforcing layer. It can be represented as a two-layer laminated sheet 50 consisting of belt-reinforcing layers 50u, 50d, as illustrated in FIG. 2(A). It is well known that when a tensile force is made to act upon this two-layer laminated sheet 50 in the circumferential direction of the tire EE', the two-layer laminated sheet 50 undergoes deformation, not only in the two-dimensional plane in which the tensile force acts, but also three-dimensionally outside the plane, so that torsioned deformation like that shown in FIG. 2(B) occurs. The ply steer mentioned above occurs because of torsional deformation of the belt-reinforcing layers.

In the past, various studies have been done to determine whether this ply steer could be reduced by adding an extra belt-reinforcing layer or layers to the existing belt-reinforcing layers. The addition of extra belt-reinforcing layers is not preferable because it adversely affects the characteristics of the radial tire such as its low fuel consumption characteristics, and increases the tire weight.

SUMMARY OF THE INVENTION

It is therefore an object of the present invention to provide a pneumatic tire in which a new contrivance is applied to the structure of the carcass cord layer but no extra belt-reinforcing layers are used, which combines a specific cord arrangement in the carcass cord layer with a cord arrangement in the belt-reinforcing layer to reduce ply steer, and which can improve the straight running stability and markedly reduce the tire weight without sacrificing any of the characteristics inherent to a radial tire such as its driving stability, high-speed durability, and load durability.

In a pneumatic tire of the type in which two belt reinforcing layers crossing each other at an angle of 15° to 30° with respect to the circumferential direction of the tire are provided over a carcass cord layer of a tread portion, the object of the present invention can be accomplished by a pneumatic tire characterized in that the carcass cord layer consists of upper and lower layers; the lower carcass cord layer continues in its widthways direction so that each of its two edges is turned up around one of a pair of right and left bead wires, respectively; the upper carcass cord layer has a split structure separated to the right and left at said tread portion, the edge portions thereof nearer the tread portion overlap the belt-reinforcing layer to a width of at least 10 mm, and the edge portions thereof nearer the bead portions are at a height of not more than 0.3 of the height of the section of the tire measured from bead toe portions, and are separated from the bead wires; and the reinforcing cords of the upper and lower carcass cord layers are arranged so that the mean value $\tfrac{1}{2}(\alpha_1 + \alpha_2)$ of the agle $\alpha_2$ of the reinforcing cords in the upper carcass cord layer and the angle $\alpha_1$ of the reinforcing cords in the lower carcass cord layer is between 95° to 120°, and the difference $(\alpha_2 - \alpha_1)$ is between 10° to 60°, measured from the side on which the angle of the reinforcing cords in the belt-reinforcing layer adjacent to the upper carcass cord layer is an acute angle with respect to the circumferential direction of the tire.

BRIEF DESCRIPTION OF THE DRAWINGS

FIG. 9 is a graph of the relationship between high-speed durability and the width of superposition a.

DESCRIPTION OF THE PREFERRED EMBODIMENTS

The present invention will be described below with reference to the accompanying drawings.

Figures 3A, 3B:
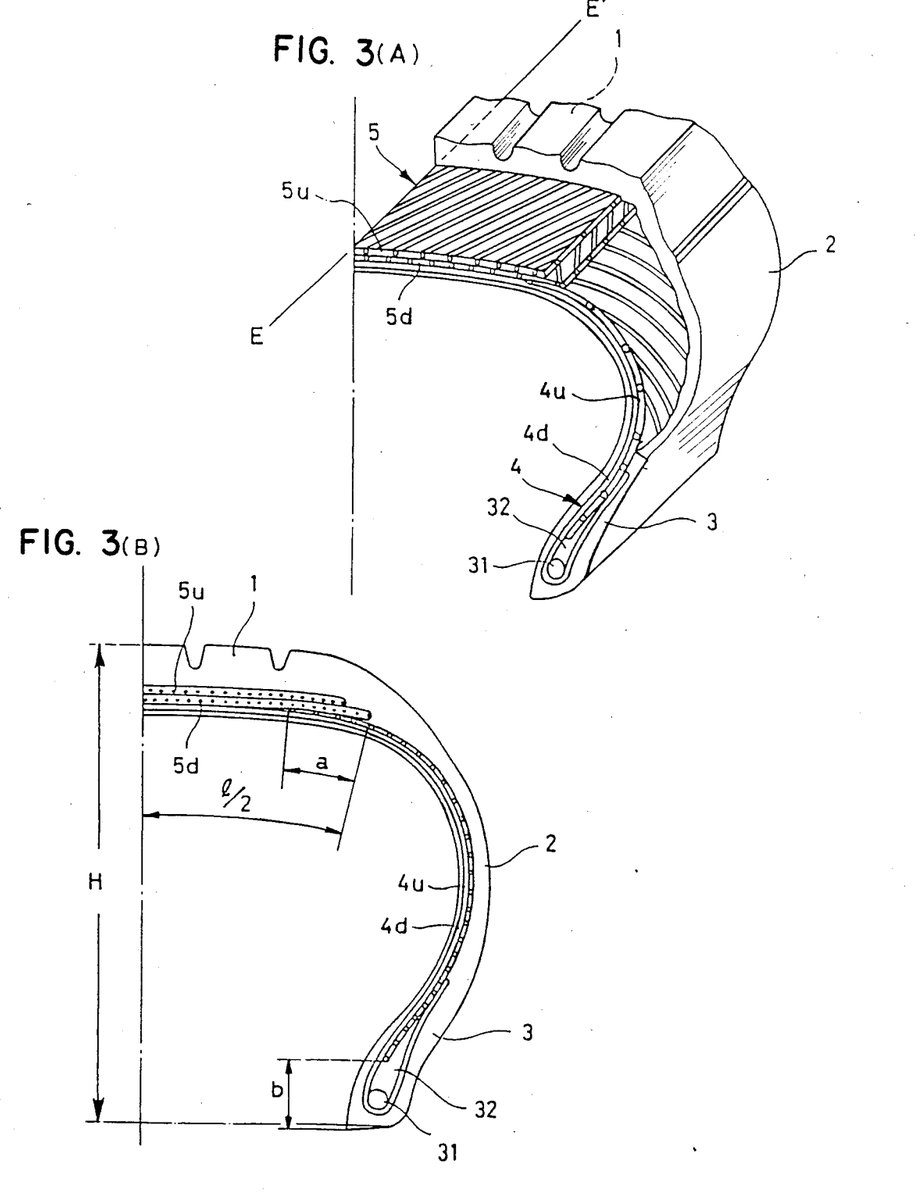
FIG. 3(A) is a perspective view of a half section of a radial tire in accordance with one embodiment of the present invention.
FIG. 3(B) is a meridional half section of the radial tire of FIG. 3(A)
Figure 4:
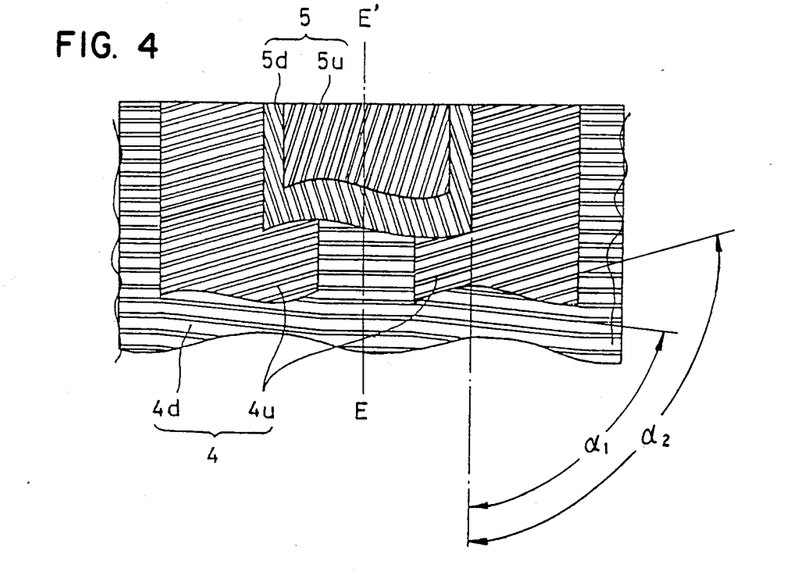
FIG. 4 is a developed view of the lamination of the carcass cord layer and belt-reinforcing layers used in the radial tire of FIG. 3.

FIG. 3(A) is a perspective view of a half section of a pneumatic tire in accordance with one embodiment of the present invention, and FIG. 3(B) is a meridional section thereof. FIG. 4 is a developed plan view of the carcass cord layer and the belt layers of this pneumatic tire.

In the drawings, reference numeral 1 denotes a tread portion and 2 a pair of right and left side wall portions that are positioned so as to extend on both sides of the tread portion. Reference numeral 3 denotes a pair of right and left bead portions that continue from the right and left side wall portions 2, respectively. A carcass cord layer 4 is positioned in such a manner that it extends from one of the bead portions 3 to the other over the inner circumferential surface of the tire, and a belt-reinforcing layer 5 consisting of steel cords is provided over this carcass cord layer 4.

The belt reinforcing layer 5 has a two-layer structure consisting of an upper belt-reinforcing layer 5u and a lower belt-reinforcing layer 5d, the reinforcing cords are arranged in such a manner that are at an angle of 15° to 30° with respect to the circumferential direction EE' of the tire, and the upper reinforcing cords cross the lower reinforcing cords.

The carcass cord layer 4 consists of upper and lower layers, a lower carcass cord layer 4d is constructed so that both of its edges are turned up around bead wires 31 of the bead portions 3 so as to wrap around bead fillers 32, but an upper carcass cord layer 4u is divided and separated into two parts so that this carcass cord layer does not cover the center of the tread portion 1 and the two parts form a pair. The upper side portions of the upper carcass cord layer 4u, which is thus divided into right and left parts, overlap the belt-reinforcing layer 5 to a width a within the tread portion. The lower edge portions nearer the bead portions are positioned at a height b above bead toe portions, and do not come into contact with the bead wires 31. This arrangement can provide a marked reduction in the weight of the radial tire because of the structure formed by the upper carcass cord layer 4u of the carcass cord layer 4. In comparison with a conventional radial tire consisting of a carcass cord layer with a complete two-layer structure, the carcass weight can be reduced by between 10 to 30%.

In order to reduce the tire weight while maintaining the high-speed durability and load durability inherent to a conventional radial tire, it is necessary that the edge portions of the upper carcass cord layer 4u nearer the tread portion and its edge portions nearer the bead portion must overlap by a width a of at least 10 mm, and the height b thereof above the bead toe portions must be not more than 0.3 of the cross-sectional height H of the tire. If the width of the overlap a is less than 10 mm, the high-speed durability of the conventional radial tire can not be maintained; and if the height b above the bead toe portions is more than 0.3H, the load durability of the conventional radial tire can not be maintained, either.

The width of the overlap a is preferably less than 0.4 of the width l of the belt-reinforcing layer 5 in the cross-sectional direction. If it is below 0.4 l, rolling resistance due to the reduction of tire weight can be reduced, and the driving comfort can be improved because the tread portion is more flexible.

To reduce the ply steer described earlier, the angle of the reinforcing cords of each of the upper and lower layers of the carcass cord layer 4 to the circumferential direction of the tire has a specific importance. In other words, the angle of the reinforcing cords in each of the upper and lower carcass cord layers 4u and 4d forming the carcass cord layer 4, with respect to the circumferential direction of the tire, must satisfy the following relationship when measured from the side on which the reinforcing cords of the lower belt-reinforcing layer 5d of the belt reinforcing layers 5u and 5d positioned in contact with the carcass cords 4, describes an acute angle with respect to the circumferential direction of the tire.

That is to say, the mean value $\beta = \frac{1}{2}(\alpha_1 + \alpha_2)$ of the angle $\alpha_1$ of the reinforcing cords in the lower carcass cord layer 4d and the angle $\alpha_2$ of those in the upper carcass cord layer 4u should be between 95° to 120°, and their difference $(\alpha_2 - \alpha_1)$ within the range of between 10° to 60°. The angle $\alpha_1$ and the angle $\alpha_2$ are measured at the edges of the upper carcass cord layer nearer the tread portion.

As described already, the angles $\alpha_1$ and $\alpha_2$ are measured from the side on which the reinforcing cords in the lower belt-reinforcing layer 5d in contact with the carcass cord layer 4 describe an acute angle with respect to the circumferential direction EE' of the tire. Accordingly, when the reinforcing cords in the lower belt-reinforcing layer 5d are arranged so as to extend downward to the left, as in the embodiment shown in FIG. 5, that angle must be measured in the clockwise direction relative to the circumferential direction EE' of the tire.

As is obvious from the relationship between the angles $\alpha_1$ and $\alpha_2$, the angle $\alpha_2$ of the reinforcing cords in the upper carcass cord layer 4u is arranged in such a manner that it is always greater than the angle $\alpha_1$ of the reinforcing cords in the lower carcass cord layer 4d and they also cross each other. If the mean value $\beta$ of the angles $\alpha_1$ and $\alpha_2$ is less than 95°, ply steer can not be improved above the level of a conventional radial tire; but if the mean value $\beta$ is greater than 120°, on the other hand, ply steer can be further improved, but at the same time the load durability drops to a level lower than that of a conventional radial tire. Even if the mean value $\beta$ of the angles $\alpha_1$ and $\alpha_2$ is within the range of between 95° to 120°, ply steer can not be improved much over that of a conventional radial tire, and the driving stability will drop unless the difference $(\alpha_2 - \alpha_1)$ is greater than 10°. If the difference $(\alpha_2 - \alpha_1)$ is greater than 60°, the ply steer can be improved, it is true, but the load durability drops unfavorably.

More preferably, the mean value $\beta$ should be less than 110° in order to facilitate the molding and vulcanization of the tire. To further improve the high-speed durability and load durability, the difference $(\alpha_2 - \alpha_1)$ should preferably be within the range of between 20° to 40°.

In the embodiment described above and shown in the figures, the edge portions of the upper carcass cord layer $4u$ of the carcass cord layer nearer the bead portions are interposed between the lower carcass cord layer $4d$ and the bead filler 32, but they can also be interposed between the turned-up edge portions of the lower carcass cord layer $4d$ and the bead filler 32. In the embodiment described above, the belt-reinforcing layer 5 has a two-layer laminated structure consisting of steel cords, but other structures may be used, such as one in which one layer is a belt-reinforcing layer of steel cords and other is made of the aramid cord with the tradename "Kevlar", or one in which both layers are belt-reinforcing layers consisting of textile cords, as is generally used in prior-art tires. Naturally, the edge portions of the belt-reinforcing layer could be bent inward. It is further possible to employ a conventional structure in which a belt-reinforcing layer of textile cords is added to the two layers described above.

As described above, in the pneumatic tire in accordance with the present invention, the reinforcing cords are arranged in such a fashion that the mean value $\beta$ of the angle $\alpha_2$ of the reinforcing cords in the upper carcass cord layer and the angle $\alpha_1$ of the reinforcing cords in the lower carcass cord layer of a two-layer carcass cord layer is between 95° to 120°, and their difference $(\alpha_2 - \alpha_1)$ is between 10° to 60°, measured from the side on which the angle of the cords in the belt-reinforcing layer adjacent to the upper carcass cord layer is at an acute angle with respect to the circumferential direction of the tire. This arrangement can reduce the ply steer that is significant in radial tires, and can reduce the tire weight without the addition of an extra belt-reinforcing layer. Moreover, in the tire of the present invention, the carcass cord layer consists of upper and lower layers wherein the lower carcass cord layer continues in the cross-sectional direction and both its edges are turned up around a pair of right and left bead wires. However, the upper carcass cord layer has a split structure in which it is separated into right and left portions at the tread, the width $a$ by which the edges thereof overlap the belt-reinforcing layer is at least 10 mm, and the height $b$ of the edge portions nearer the bead portions above the bead toe portions is less than 0.3 of the cross-sectional height $H$ of the tire and they are separated from the bead wires. This arrangement can markedly reduce the tire weight while improving the characteristic features inherent to radial tires, such as their driving stability, high-speed durability, and load durability, to levels higher than those of conventional radial tires. Since the upper carcass cord layer is largely removed at the tread portion, the tread portion is more flexible than in a conventional radial tire, which further improves the driving comfort of the tire.

Hereinafter, the present invention will be described in further detail with reference to specific experimental examples.

EXPERIMENTAL EXAMPLE 1

Radial tires with the structure of carcass cord layers and belt-reinforcing layers shown in FIGS. 3(A), 3(B) and 4 were produced, in which the difference between the angles of the upper and lower carcass cord layers $(\alpha_2 - \alpha_1)$ was kept constant at 30°, but the mean value $\beta$ of these angles was varied.

The reinforcing cords of the upper and lower belt-reinforcing layers of each tire crossed one another and were at an angle of 20° with respect to the circumferential direction of the tire, and a=35 mm, b=25 mm, l=140 mm, and H=142. The tire size was 195/70HT14 and a 5½-JJ×14 rims were used.

Figure 7:
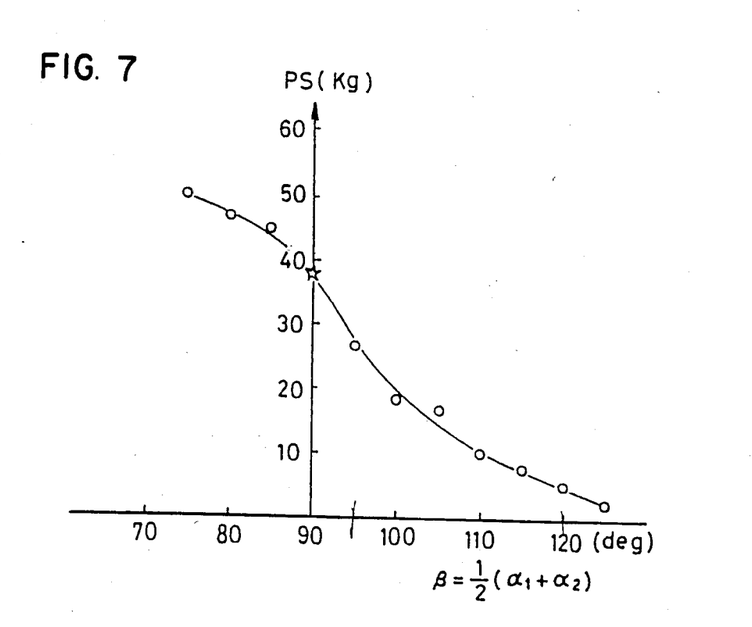
FIG. 7 is a graph of the relationship between the ply steer PS and the mean angle $\beta$.

The ply steer of each tire was measured in accordance with the uniformity testing method JASO C607 for car tires, with the results as illustrated in FIG. 7.

In FIG. 7, the tire indicated by the star was a conventional radial tire with the relationship $\alpha_1 = \alpha_2 = 90°$. As can be seen clearly from the graph, the tires in which the mean value $\beta$ of the angles $\alpha_1$ and $\alpha_2$ was greater than 95° had a ply steer which was smaller than that of the conventional tire and the linear drivability could be improved without adding any other belt-reinforcing layer.

In the tires in which the mean angle $\beta$ was less than 90°, the ply steer was greater than that of the conventional radial tire.

EXPERIMENTAL EXAMPLE 2

Radial tires with the structure of carcass cord layers and belt-reinforcing layers shown in FIGS. 3(A), 3(B), and 4 were produced in which the mean value $\beta$ of the sum of the reinforcing cord angles of the upper and lower carcass cord layers was kept constant at 100° but their difference $(\alpha_2 - \alpha_1)$ was varied.

In each tire, the reinforcing cords of the upper and lower belt-reinforcing layers crossed one another and were at an angle of 20° with respect to the circumferential direction of the tire, and a=35 mm, b=25 mm and H=142 mm. The tire size was 195/70HR14 and 5½-JJ×14 rims were used.

Figure 8:
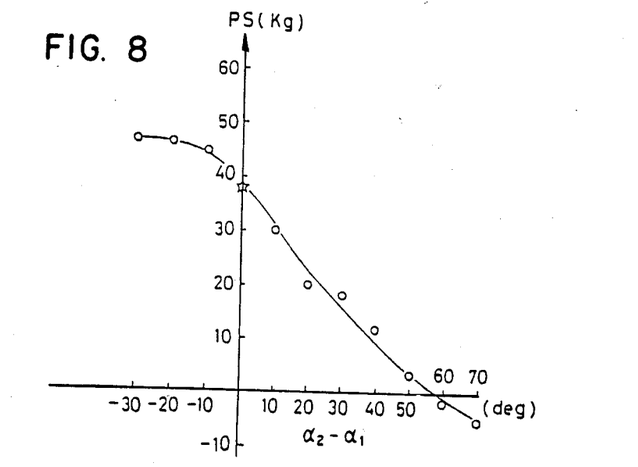
FIG. 8 is a graph of the relationship between the ply steer PS and the angle difference $(\alpha_2 - \alpha_1)$.

The ply steer of each tire was measured in accordance with the uniformity testing method JASO C607 for car tires, with the results as shown in FIG. 8.

In FIG. 8, the tire indicated by the star ☆ was a conventional tire with the relationship $\alpha_1 = \alpha_2 = 90°$, As can be seen clearly from this graph, the tires in which the difference in angles $(\alpha_2 - \alpha_1)$ was at least 10° had a ply steer smaller than that of the conventional radial tire, and the linear drivability could be improved without adding any other belt-reinforcing layer.

The tires in which the difference in angles $(\alpha_2 - \alpha_1)$ was negative had a ply steer greater than that of the conventional tire.

EXPERIMENTAL EXAMPLE 3

Radial tires with the structure of carcass cord layers and belt-reinforcing layers shown in FIGS. 3(A), 3(B), and 4 were produced in which the mean value $\beta$ of the sum of the reinforcing cord angles of the upper and lower carcass cord layers was kept constant at 100°, and their difference $(\alpha_2-\alpha_1)$ at 30°, but the width a by which the upper carcass cord layer overlapped the belt reinforcing layer was varied.

In each tire, the reinforcing cords of the upper and lower belt reinforcing layers crossed one another and were at an angle of 20° with respect to the circumferential direction of the tire, and b=25 mm, l=140 mm and H=142 mm. The tire size was 195/70Hr14 and a 5½-JJ×14 rims were used.

Figure 9:
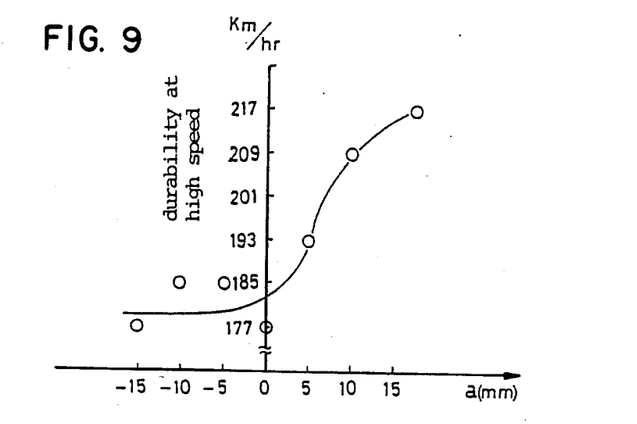

The high-speed durability of these tires was measured by an indoor high-speed durability test at an air pressure of 2.0 kg/cm², with the results as shown in FIG. 9. The drum diameter used for this indoor high-speed durability test was 1707 mm, and the load was 550 kg. The driving conditions was in accordance with FMVSS109. The initial driving speed was 81 km/h and the speed was increased at a rate of 8 km/hr every 30 minutes until the tires broke.

As can be seen clearly from FIG. 9, the high-speed durability can be markedly improved if the width of overlap a is at least 10 mm.

EXPERIMENTAL EXAMPLE 4

Various radial tires with the structure of carcass cord layers and belt-reinforcing layer shown in FIGS. 3(A), 3(B), and 4 were produced, in which the mean value $\beta$ of the sum of the reinforcing cord angles of the upper and lower carcass cord layers was kept constant at 102° and their difference $(\alpha_2-\alpha_1)$ at 28°, but the height b of the edge portions of the upper carcass cord layer nearer the bead portions was varied.

In each tire, the reinforcing cords of the upper and lower belt-reinforcing layers crossed one another and were at an angle of 20° with respect to the circumferential direction of the tire, and a=35 mm, l=140 mm and H=142 mm. The tire size was 195/70HR14 and 5½-JJ×14 rims were used.

Figure 10:
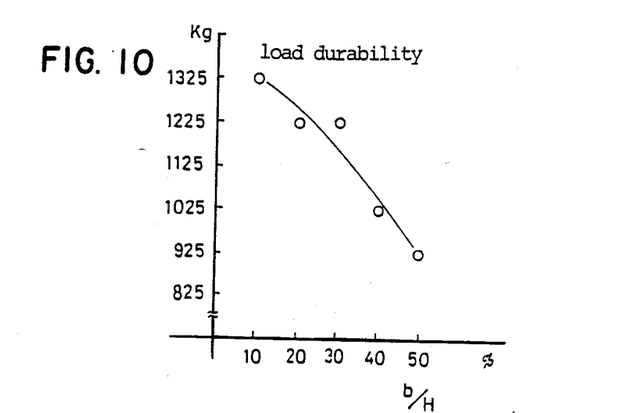
FIG. 10 is a graph of the relationship between load durability and the ratio b/H.

The load durability of these radial tires was measured by an indoor drum load durability test at an air pressure of 2.1 kg/cm², the results thereof are shown in FIG. 10 in terms of the ratio b/H of the height of the edges of the upper carcass cord layer nearer the bead portions to the tire cross-sectional height. The drum diameter used for this indoor drum load durability test was 1707 mm, the initial speed was 80 km/hr and the initial load was 525 kg. The load was increased by 100 kg every five hours.

As can be seen clearly from FIG. 10, the load durability is very good when the ratio b/H is less than 0.3.

EXPERIMENTAL EXAMPLE 5

Radial tires A, B, C and D were produced with the conditions illustrated in the table below. The belt-reinforcing layer had the relationship in which upper and lower layers crossed one another and were at an angle of 20° with respect to the circumferential direction of the tire. The tire size was 195/70HR14 and 5½-JJ×14 rims were used. Of these tires, A is a conventional radial tire, B and C are radial tires in accordance with the present invention, and D is a comparative radial tire in which the angle difference $(\alpha_2-\alpha_1)$ is negative.

Figure 5:
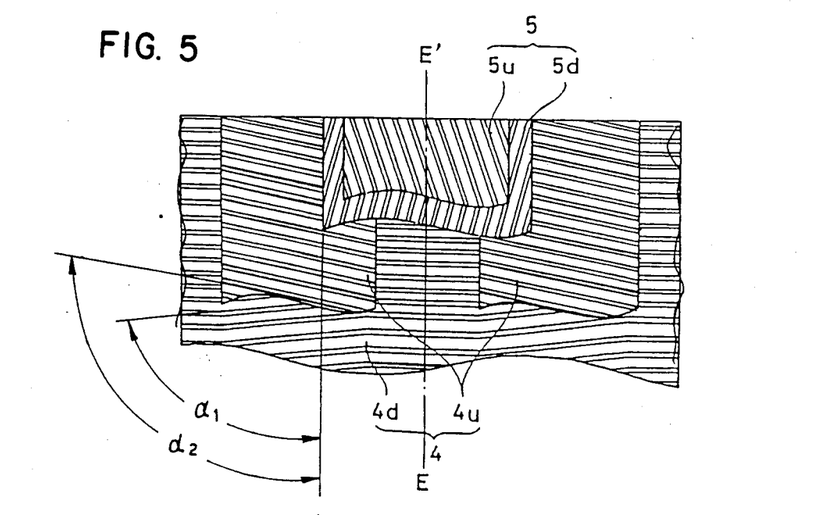
FIG. 5 is a similar developed view of the lamination in another embodiment of the present invention.
Figure 6:
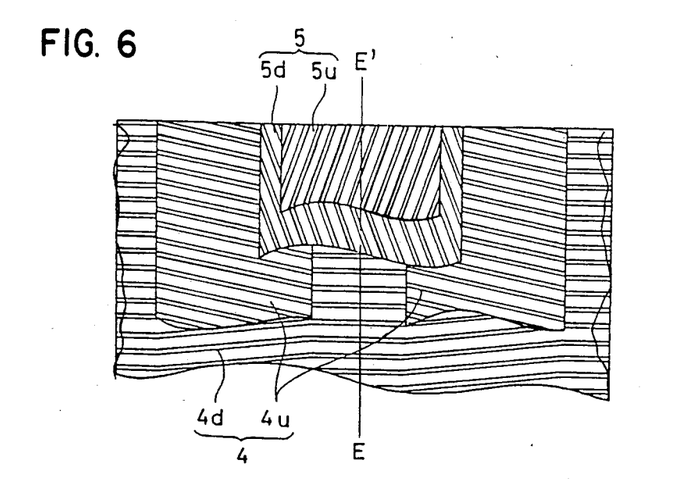
FIG. 6 is a similar developed view of the lamination in a comparative example.

| Tire | A | B | C | D |
| --- | --- | --- | --- | --- |
| Carcass structure | 2 complete sheets | FIG. 4 | FIG. 5 | FIG. 6 |
| $\beta$ | 90° | 100° | 100° | 100° |
| $\alpha_2-\alpha_1$ | 0° | 30° | 30° | −30° |
| a | — | 35 mm | 35 mm | 35 mm |
| l | 140 mm | 140 mm | 140 mm | 140 mm |
| b | — | 25 mm | 25 mm | 25 mm |
| H | 142 mm | 142 mm | 142 mm | 142 mm |

The following tests were carried out on each of these tires.

I. Reaction force when driven over protuberance in an indoor drum driving test, used as a characteristic representing driving comfort;
II. Cornering power used as a value of driving stability (½ of the cornering force when a slip angle of 2° is applied to the tire);
III. Rolling resistance in an indoor drum driving test, used as a value of low fuel consumption performance;
IV. Ply steer based on the uniformity testing method JASO C607 for car tires.

In the tests I, II, and III, the tire inflation pressure was 1.9 kg/cm², and the tire air pressure for test IV was in accordance with JASO C607.

The results of these tests were expressed in terms of ratios with the values for the conventional tire A taken to be 100 for the tests I, II, and III, and in kg for test IV. The results are tabulated in the table below.

| Tire | A | B | C | D |
| --- | --- | --- | --- | --- |
| Test I | 100 | 93 | 94 | 96 |
| II | 100 | 101 | 102 | 99 |
| III | 100 | 93 | 93 | 94 |
| IV | −36 | −18 | +15 | −48 |

It can be seen from the table above that test IV shows that the ply steer of the radial tires B and C in accordance with the present invention is markedly improved over that of the conventional radial tire, and that test III shows that the tire weight is reduced to further improve the low fuel consumption performance. It can also be seen that even under such conditions, the driving comfort as well as driving stability are better than those of the conventional radial tire, as shown by tests I and II.

What is claimed is:

1. In a pneumatic tire having right and left bead wires, right and left side wall portions and a tread portion between the side wall portions and in which two belt reinforcing layers each containing reinforcing cords are laid over each other so that the cords cross each other at an angle of 15° to 30° with respect to the circumferential direction of the tire and in which the belt reinforcing layers are laid over a carcass cord layer in the tread portion of the tire, the improvement wherein said carcass cord layer consists of upper and lower layers; said lower carcass cord layer being a continuous layer that extends in the widthways direction of the tire so that each of its ends is turned up around one of the pair of right and left bead wires, respectively; said upper carcass cord layer being separated into two parts; the edge portions of said upper carcass cord layer parts nearer said tread portion overlaping said belt reinforcing layer to a width of at least 10 mm but less than 0.4 of the width of the belt reinforcing layers, while the edge portions thereof nearer said bead portions are separated from said bead wires but not by more than a height of 0.3 of the cross-sectional height of the tire measured from the bead portion; and in which the reinforcing cords forming said upper and lower carcass cord layers are arranged so that the mean value $[\frac{1}{2}(\alpha_1+\alpha_2)]$ of the angle $\alpha_2$ of the reinforcing cords in the upper carcass cord layer and the angle $\alpha_1$ of the reinforcing cords in the lower carcass cord layer is between 95° to 120°, and the difference $(\alpha_2-\alpha_1)$ is between 10° to 60°, the angles $\alpha_1,\alpha_2$ being measured with respect to the circumferential direction of the tire and from the side of the tire at which the angle of the reinforcing cords in the belt reinforcing layer adjacent to the upper carcass cord layer is at an acute angle with respect to the circumferential direction of the tire.

2. The tire of claim 1, in which the mean value of the angles $\alpha_1$, $\alpha_2$ is between 95° and 110°.

3. The tire of claim 1, in which the difference between the angles $\alpha_2$, $\alpha_1$ is between 20° to 40°.

4. The tire of claim 1, in which the turned-up edge portions of the lower carcass cord layer overlap the edge portions of the parts of the upper carcass cord layer which lie nearest the bead portions.

* * * * *